June 6, 1933.  H. L. KELLER  1,913,162
SYNCHRO-MESH TRANSMISSION
Filed Sept. 14, 1931   2 Sheets-Sheet 1
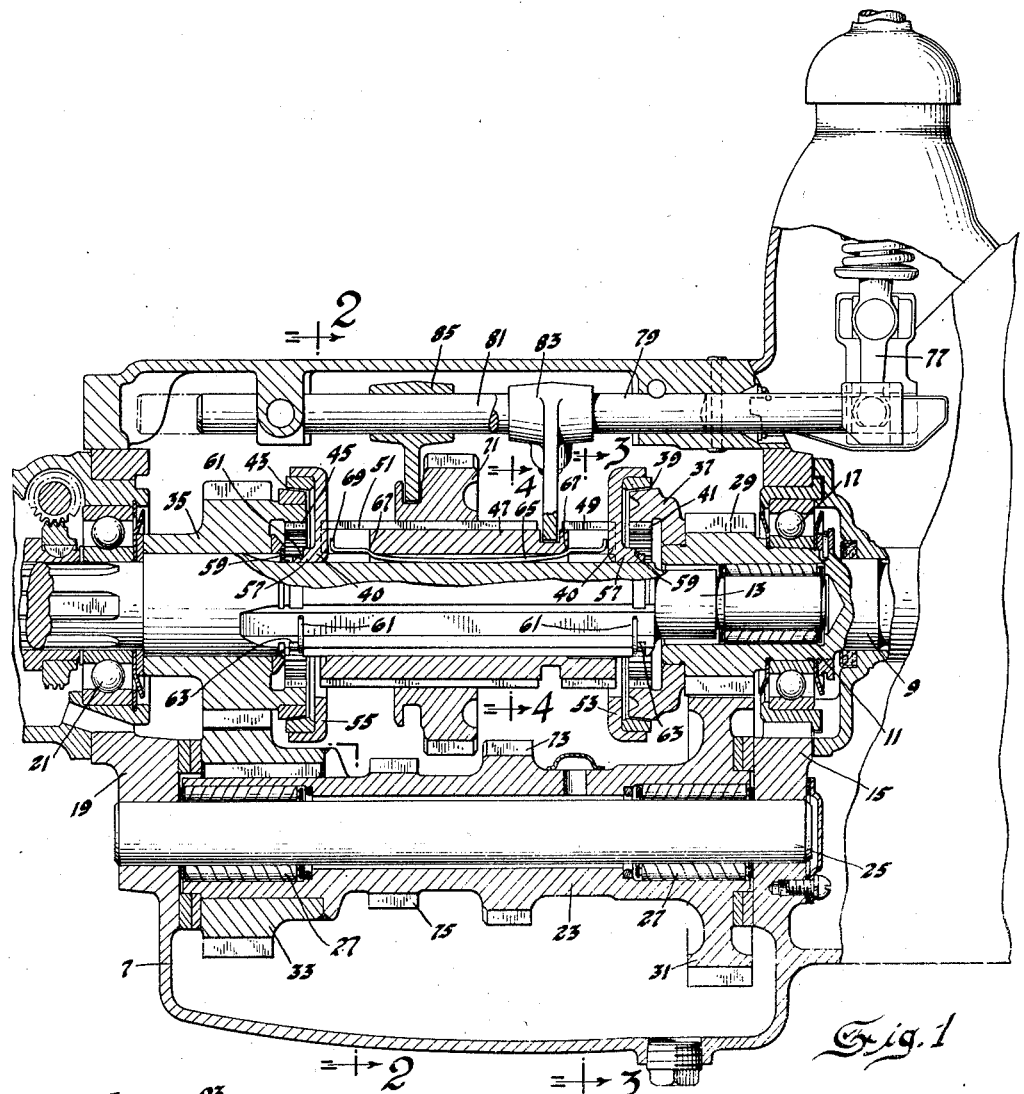
Fig.1
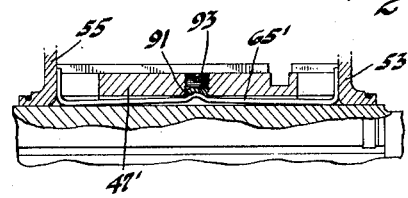
Fig.6
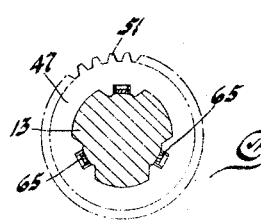
Fig.4
Fig.7
Inventor
Harry L. Keller
By Blackwood, Spencer & Flint
Attorneys June 6, 1933.   H. L. KELLER   1,913,162
SYNCHRO-MESH TRANSMISSION
Filed Sept. 14, 1931   2 Sheets-Sheet 2

Inventor
Harry L. Keller
By Blackmore, Spencer & Hiatt
Attorney

Patented June 6, 1933

1,913,162

UNITED STATES PATENT OFFICE

HARRY L. KELLER, OF FLINT, MICHIGAN, ASSIGNOR TO GENERAL MOTORS CORPORATION, OF DETROIT, MICHIGAN, A CORPORATION OF DELAWARE

SYNCHRO-MESH TRANSMISSION

Application filed September 14, 1931. Serial No. 562,689.

This invention relates to change speed transmission, having been designed particularly for use on vehicles.

An object of the invention is an improved structural arrangement for synchronizing relatively moving parts to facilitate quickly and quietly changing from one gear ratio to another.

Other objects and advantages will be understood from the following specification and from the accompanying drawings.

In the drawings—

Fig. 1 is a longitudinal vertical section through one embodiment of the improved change speed transmission.

Fig. 4 is a transverse section on line 4—4 of Fig. 1.

Fig. 6 is a longitudinal section of a portion of a modified form.

Fig. 7 is a longitudinal section of another modification.

Figures 2, 3:
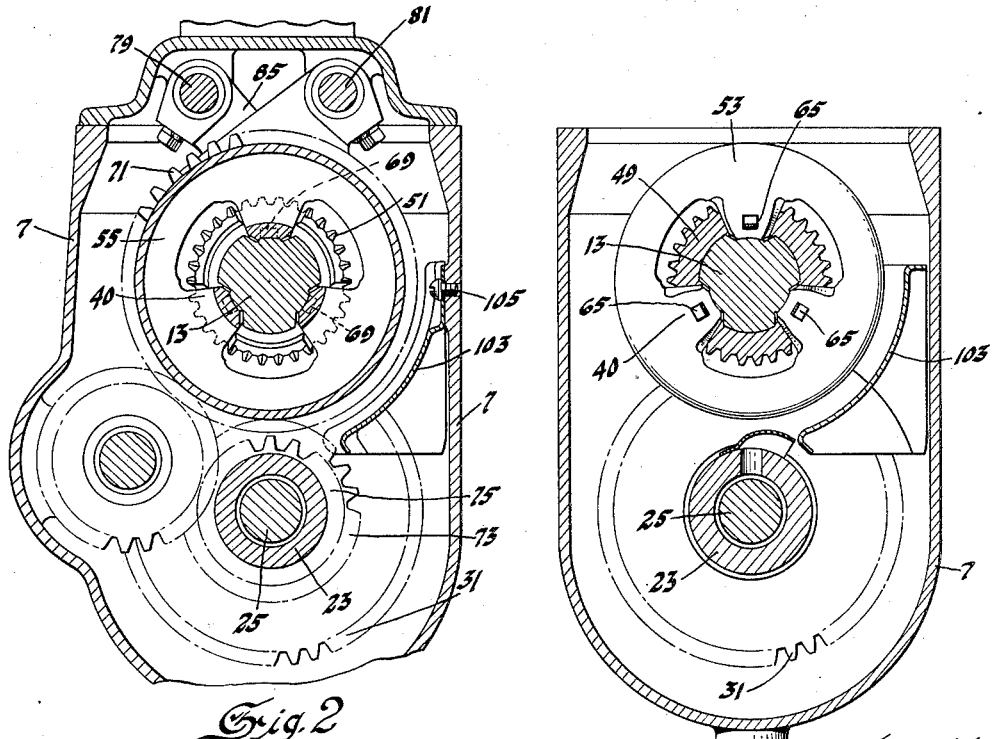
Fig. 2 is a transverse section on line 2—2 of Fig. 1.
Fig. 3 is a similar section on line 3—3 of Fig. 1.
Figure 5:
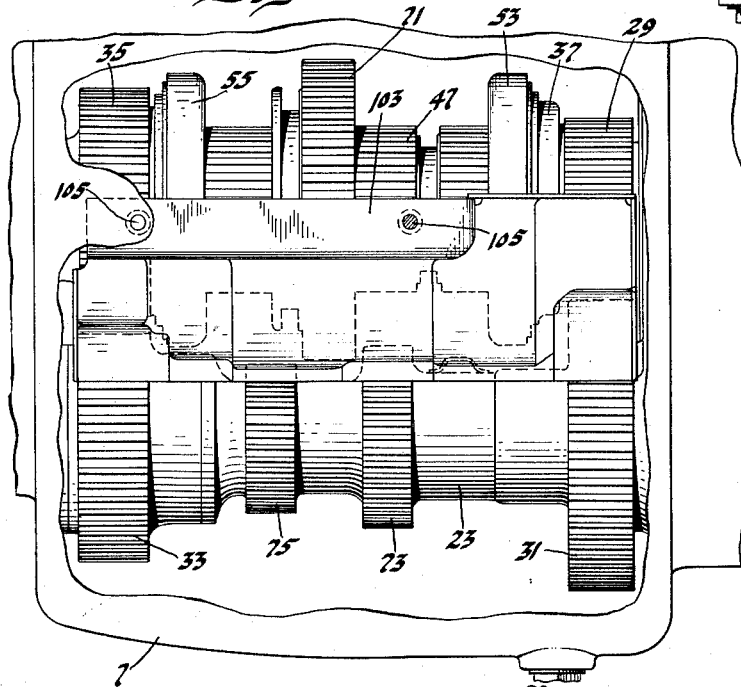
Fig. 5 is a view of a transmission housing with a portion of the wall broken away to illustrate the oil baffle.

In the drawings, numeral 7 designates the transmission casing. Entering the casing is a driving shaft 9 having its open end provided with a roller bearing 11 to receive the reduced end of spline shaft 13. The driving shaft is journaled in the front wall 15 by means of bearing 17. The driven shaft is journaled in the rear wall 19 by means of bearing 21. At 23 is a countershaft rotatably supported upon a fixed shaft 25 mounted in the front and rear walls, the shaft 23 being rotatably supported upon shaft 25 by means of bearings 27.

Within the housing the driving shaft 9 is formed with a gear 29 which is in constant mesh with a gear 31 on the countershaft. At the other end of the countershaft a gear 33 thereon is in constant mesh with a gear 35 which is loosely mounted on the spline shaft 13.

Secured to the extreme end of driving shaft 9 is a ring member 37 having externally a conical friction face 39, and internally a ring of clutch teeth 41. Gear 35 has a forward extension provided with a conical friction face 43 and with a ring of internal clutch teeth 45.

A clutch member 47 is slidably and non-rotatably arranged on the splined portion of shaft 13. It has terminally toothed spaced arcuate extensions at 49 and 51, these extensions being intended to engage teeth 41 and 45 respectively.

Two friction drums are designated by numerals 53 and 55. They have at their peripheral regions conical surfaces to frictionally engage the cooperating surfaces 39 and 43. From the peripheral region of these drums there are inwardly extended radial tongues 40 extending between the spaced toothed extensions of the clutch member 47. By means of this telescopic arrangement it is possible to move the clutch member 47 axially between the tongues of the friction drums and to effect the engagement of the teeth 49 and 41 or 51 and 45. The inner ends of the tongues of the friction clutch drums are formed with hub portions 57 resting within the grooves between the lands of the spline shaft. These inner ends of the tongues are, however, circumferentially dimensioned to permit a limited rotary movement of the drums relative to the spline shaft. Only in one intermediate position of this rotary movement of adjustment is it possible to move the clutch extensions between the tongues. In other positions one pair of edges of the clutch extension and drum engage. As the clutch member 47 is moved toward its tooth-engaging position, the said edges of the extension of the clutch member 47 and the drum may engage. The engaging surfaces are angularly warped in a known manner and for which no invention is herein claimed to afford a surface rather than a line contact. As is usual in constructions of this kind it is possible to overcome the engagement and move the clutch extension through the spaces between the tongues only when the members to be engaged are in synchronism.

In the process of gear shifting it may be assumed that the clutch member 47 carried by the spline shaft will be rotating at a rate differing from that of the clutch member with which it is to be engaged. The frictionally engaging surfaces at 39 or 43 will therefore tend to hold the frictional drum, 53 or 55, toward one or the other of the walls of the lands of the spline shaft. The warped angular surface of the clutch member 47 and the friction drum therefore engage and prevent free passage of the clutch extensions between the tongues of the friction drum. In order to effect the engagement of the clutch teeth it is therefore necessary to slightly rotate the friction drum by the axial movement of clutch member 47 in the opposite direction to that given it by the rotation of the frictional clutch elements 39 or 43. This effort to so rotate the drum as to permit the passage of the clutch member is resisted by the angularly engaging faces as long as unequal rates of rotation persist. When the members to be engaged are synchronized by the action of the friction clutch, the necessary rotation of the friction drum by the axial movement of the sliding clutch member is easily effected.

To mount the friction drum for slight axial movement to permit engagement and disengagement of the conical frictional surfaces, the following construction is provided. The hubs 57 are provided with grooves 59 and a spring ring 61 extends through these grooves and also through grooves 63 in the lands of the spline shaft. The grooves 63 are somewhat elongated axially to provide the necessary axial movement of the friction drum in order to facilitate the engagement and release of the friction clutch. The following construction is provided to ensure the initial engagement of the friction clutch for the purpose of effecting synchronization. Within one or more of the grooves between the lands of the spline shaft are elongated substantially flat resilient members 65. These spring members are also positioned within channels cut into the portions of the clutch member 47 between the lands of the spline shaft. At the junction of each end of the circularly continuous part of the clutch member 47 and the cut away ends are shoulders 67 which are normally engaged by parts of the spring members 65 which are at this portion bowed outwardly as shown in Fig. 1. The outer ends of the spring members 65 are turned radially as at 69, these ends engaging the faces of the drums 53 and 55.

The outer periphery of clutch member 47 is splined for the sliding engagement of a gear 71 intended to engage gear 73 when in one position and also to engage a gear driven by gear 75 when in another position. These gear engagements are intended to afford low speed and reverse driving.

No novelty is herein claimed for the shift mechanism per se. There is shown a more or less conventional shift lever 77 which is manually operated to engage or move one or the other of two shift rails 79 and 81. One rail has a fork connection 83 with the clutch member 47 for high and second speed driving and the other has a fork connection with the low and reverse driving gear 71.

When the rail 81 is shifted in one direction, gears 73 and 71 are engaged to drive in low speed. When 71 is shifted in the opposite direction gear 75, the reverse idler, and gear 71 effect the reverse drive in the usual way. When rail 79 is moved toward the front, the clutch member 47 moves in the same direction carrying with it springs 65, the ends 69 of which push the friction drum 53. The friction face of this drum engages the face 39 of the member 37. Any inequality of the rotary movement of the two shafts then causes drum 53 to be rotated to a limited extent relative to shaft 13. This brings the warped faces of the drum and clutch member 47 into contact. The engagement of these faces resists further axial movement of the clutch member 47. When the frictional clutch has effected a synchronization of the members carrying the teeth 49 and 41, the resistance offered at the engaging faces ceases and the teeth 49 of the clutch member 47 engage the teeth 41 of the element 37, whereupon a direct drive at high speed is obtained. The operation of the shift mechanism for second speed is similar and requires no explanation.

As a substitute for the means to initiate the frictional clutch action, there is shown in Fig. 6 a substitute arrangement. Here the drums 53 and 55 are the same as before, and the clutch member 47' is much like clutch member 47. The spring element 65' is not bowed outwardly to engage the shoulder between the central part and the cut away ends of the clutch member. In place of this construction the center of the spring is bowed upwardly as at 91 into a channel or groove or hole bored radially in an intermediate part of the clutch element. In this hole there may be and preferably is a threaded plunger 93, the threaded arrangement being provided to render the plunger adjustable. The engagement of this poppet part 91 with the plunger 93 causes the spring to move upon the initial movement of the clutch member 47' in the same way that the engagement at the shoulder 67 caused the spring 65 to move in the embodiment previously described. In both instances after synchronization the spring yields and permits the clutch member to move and the clutch teeth to engage.

Another embodiment is shown by Fig. 7. In this form the clutch member is designated by numeral 47''. It has a radial opening like that in Fig. 6. In this opening is a plug 97 yieldingly held by a spring 99 having an abutment at 101. This abutment may be an integral part of the clutch member or it may be a separate member inserted therein. In this case the part 65'' may be rigid and not resilient if preferred. The resilient action of the spring 99 causes the movement of 65'' together with the clutch member 47'' upon the initial movement of the latter. In the same way as before this brings about the frictional clutch synchronizing action.

With this transmission provision has been made to guide the lubricant so that it will follow along the teeth of the gears. To that end there is employed a baffle in the form of a plate 103 secured by fastening means 105 to one of the side walls of the housing. The baffle plate extends from the region of its attachment along a wall of the housing toward the region between the driven shaft and the countershaft. It is shaped throughout its length to lie somewhat closely adjacent the several gears with the result that the oil will follow along the teeth of the gears and ensure sufficient lubrication.

I claim:

1. In transmission mechanism, coaxial first and second members, one of which is mounted for rotation relative to the other and movable axially toward and from that other, clutch teeth carried by each of said members, said second member also having a frictional clutch surface, an intermediate member having a frictional clutch surface to cooperate with said first-mentioned frictional clutch surface, said first member and said intermediate frictional clutch member arranged for relative telescopic movement, means yieldingly connected to and moved by said first member upon its initial movement toward the second member to move said intermediate member and effect frictional engagement with the frictional surfaces of said second member, said first member and intermediate frictional member having coacting surfaces to engage and resist a completion of the axial movement of the first member into clutch tooth-engaging position with the second member until the first and second members assume a synchronous rotation under the influence of the engagement of said frictional surfaces, said yieldingly connected means comprising a flat element having an end engaging the said intermediate member and another part yieldingly engaging a part of said first member to the end that it may yield and permit relative movement between the first member and itself when the intermediate member is in engagement with the clutch face of the second member.

2. In transmision mechanism, coaxial first and second members, one of which is mounted for rotation relative to the other and movable axially toward and from that other, clutch teeth carried by each of said members, said second member also having a frictional clutch surface, an intermediate member having a frictional clutch surface to cooperate with said first-mentioned frictional clutch surface, said first member and said intermediate frictional clutch member arranged for relative telescopic movement, means yieldingly connected to and moved by said first member upon its initial movement toward the second member to move said intermediate member and effect frictional engagement with the frictional surface of said second member, said first member and intermediate frictional member having coacting surfaces to engage and resist a completion of the axial movement of the first member into clutch tooth-engaging position with the second member until the first and second members assume a synchronous rotation under the influence of the engagement of said frictional surfaces, said yieldingly connected means comprising a flat spring member having an end engaging the intermediate member and a bent portion yieldingly engaging a shoulder on the first member, whereby the movement of the first member may overcome the resiliency of the spring member and thereafter move relatively to said spring member and also relatively to the intermediate member and into toothed clutch engagement with the second member.

3. In transmission mechanism, coaxial first and second members, one of which is mounted for rotation relative to the other and movable axially toward and from that other, clutch teeth carried by each of said members, said second member also having a frictional clutch surface, an intermediate member having a frictional clutch surface to cooperate with said first-mentioned frictional clutch surface, said first member and said intermediate frictional clutch member arranged for relative telescopic movement, means yieldingly connected to and moved by said first member upon its initial movement toward the second member to move said intermediate member and effect frictional engagement with the frictional surface of said second member, said first member and intermediate frictional member having coacting surfaces to engage and resist a completion of the axial movement of the first member into clutch tooth-engaging position with the second member until the first and second members assume a synchronous rotation under the influence of the engagement of said frictional surfaces, said yieldingly connected means comprising an elongated member associated with said first member and terminally engaging said intermediate member, said yieldingly connected means being resilient and having a deflected portion movable into and out of a recessed portion of said first member.

4. In transmission mechanism, coaxial first and second members, one of which is mounted for rotation relative to the other and movable axially toward and from that other, clutch teeth carried by each of said members, said second member also having a frictional clutch surface, an intermediate member having a frictional clutch surface to cooperate with said first-mentioned frictional clutch surface, said first member and said intermediate frictional clutch member arranged for relative telescopic movement, means yieldingly connected to and moved by said first member upon its initial movement toward the second member to move said intermediate member and effect frictional engagement with the frictional surface of said second member, said first member and intermediate frictional member having coacting surfaces to engage and resist a completion of the axial movement of the first member into clutch tooth-engaging position with the second member until the first and second members assume a synchronous rotation under the influence of the engagement of said frictional surfaces, said yieldingly connected means comprising an elongated member associated with said first member and terminally engaging said intermediate member, said yieldingly connected means being resilient and having a deflected portion yieldingly seated in a recessed portion of said first member and an adjustable plug in said recess to engage said deflected portion.

5. In transmission mechanism, coaxial first and second members, one of which is mounted for rotation relative to the other and movable axially toward and from that other, clutch teeth carried by each of said members, said second member also having a frictional clutch surface, an intermediate member having a frictional clutch surface to cooperate with said first-mentioned frictional clutch surface, said first member and said intermediate frictional clutch member arranged for relative telescopic movement, means yieldingly connected to and moved by said first member upon its initial movement toward the second member to move said intermediate member and effect frictional engagement with the frictional surface of said second member, said first member and intermediate frictional member having coacting surfaces to engage and resist a completion of the axial movement of the first member into clutch tooth-engaging position with the second member until the first and second members assume a synchronous rotation under the influence of the engagement of said frictional surfaces, said yieldingly connected means comprising an elongated member associated with said first member and terminally engaging said intermediate member, a spring detent carried by said first member and engaging an intermediate part of said yieldingly connected means.

6. In transmission mechanism, coaxial first and second members, one of which is mounted for rotation relative to the other and movable axially toward and from that other, clutch teeth carried by each of said members, said second member also having a frictional clutch surface, an intermediate member having a frictional clutch surface to cooperate with said first-mentioned frictional clutch surface, said first member and said intermediate frictional clutch member arranged for relative telescopic movement, means yieldingly connected to and moved by said first member upon its initial movement toward the second member to move said intermediate member and effect frictional engagement with the frictional surface of said second member, said first member and intermediate frictional member having coacting surfaces to engage and resist a completion of the axial movement of the first member into clutch tooth-engaging position with the second member until the first and second members assume a synchronous rotation under the influence of the engagement of said frictional surfaces, said yieldingly connected means comprising an elongated member associated with said first member and terminally engaging said intermediate member, a spring detent carried by said first member and said yieldingly connected means having a depressed portion engaged by said spring detent.

7. In a transmission, a spline shaft, a slidable clutch member axially movable and non-rotatably mounted thereon, said clutch member having terminally spaced arcuate projections equipped with clutch teeth, a coaxial toothed clutch member, said last-named member having a frictional surface, a member intermediate said toothed clutch members, said intermediate member having a surface to frictionally engage the first mentioned frictional surface, said intermediate member also having spoked portions extending from its periphery between the arcuate projections of the first mentioned clutch member, said spokes extending between the lands of the spline shaft and seated in the grooves thereof, said spokes dimensioned to provide a limited rotary movement relative to said shaft, and means yieldingly associated with said first clutch member to effect movement of the intermediate member and engagment of said frictional surfaces and synchronization of said toothed clutch carrying elements.

8. The invention defined by claim 7, said intermediate member having a grooved hub, a ring carried in the groove of said hub, said spline shaft having in its lands grooves to also receive said ring, said spline shaft grooves being somewhat elongated to permit a limited axial movement of the intermediate member.

In testimony whereof I affix my signature.

HARRY L. KELLER.